United States Patent [19]
Sartorio

[11] 3,824,893
[45] July 23, 1974

[54] TRIDIMENSIONAL UNIVERSAL TRACER, SLIDABLE ON AIR BEARINGS, FOR CONTINUOUS, HIGH-SPEED COPYING OF PROFILES OF MODELS

[75] Inventor: Franco Sartorio, Moncalieri, Italy

[73] Assignee: D.E.A. Digital Electronic Automation S.p.A., Moncalieri (Turin), Italy

[22] Filed: July 6, 1972

[21] Appl. No.: 269,353

[30] Foreign Application Priority Data
July 7, 1971 Italy .................... 69284/71

[52] U.S. Cl. ................ 90/62 A, 33/23 K, 90/13.5, 250/231 R
[51] Int. Cl. ............................. B23q 35/34
[58] Field of Search ............... 90/62 R, 62 A, 13.5; 251/3; 250/231 R; 33/27 K, 23 K

[56] References Cited
UNITED STATES PATENTS

| | | | |
|---|---|---|---|
| 1,587,190 | 6/1926 | Shaw | 90/62 |
| 2,539,027 | 1/1951 | Marchont | 33/23 K |
| 3,122,970 | 3/1964 | Rhoades | 90/62 |
| 3,139,002 | 6/1964 | Evans | 251/3 X |
| 3,229,587 | 1/1966 | Chauvel | 90/62 A |
| 3,252,379 | 5/1966 | Labruyere | 90/62 |
| 3,557,379 | 1/1971 | Kelsey | 33/23 K X |
| 3,731,563 | 5/1973 | Williams et al. | 33/23 K X |

FOREIGN PATENTS OR APPLICATIONS
512,234  8/1939  Great Britain ................ 90/62

Primary Examiner—Andrew R. Juhasz
Assistant Examiner—F. R. Bilinsky
Attorney, Agent, or Firm—Ladas, Parry, Von Gehr, Goldsmith & Deschamps

[57] ABSTRACT

A universal tridimensional tracer adapted to be connected with a measuring head of a measuring machine or a machine tool is described. The main feature of the point of this tracer is that of having rather wide excursions which are added to the movements along the three axes $x$, $y$ and $z$ of the machine on which said tracer point is installed. Owing to the negligible inertia of this tracer point, its movement can take place at high speed, allowing drastic reduction of the copying time of the model. The axial and transverse displacements of the rod to which the tracer point is secured are independent of one another, said displacements being measured by different transducers.

8 Claims, 10 Drawing Figures

TRIDIMENSIONAL UNIVERSAL TRACER, SLIDABLE ON AIR BEARINGS, FOR CONTINUOUS, HIGH-SPEED COPYING OF PROFILES OF MODELS

CROSS-REFERENCE TO RELATED APPLICATION

Applicant claims priority from corresponding Italian Pat. application Ser. No. 69284/71, filed July 7, 1971.

BACKGROUND OF THE INVENTION

The object of the present invention, intended for improving copying processes, is a universal tridimensional tracer for continuous, high-speed copying of models and the like.

By "copying operation" is intended to mean the machining of a workpiece in conformity with a model and, in general, this operation becomes necessary and/or suitable particularly every time a workpiece must be obtained, having a shape defined by complicated surfaces, such as in the case of dies or the like. Conventionally, the workpiece is worked on machines called profile-copying machines; the operation of copying the model and the machining of the workpiece are accomplished simultaneously on the same machine, where the tool or milling cutter follows the movements of the tracer point, which has a shape similar to that of the cutter.

These machines, intended for machining of dies for sheet metal and for shaping bodies of motor vehicles, for instance, are very heavy and, moreover, the material of the dies is highly hard and tough, whereby the copying process is extremely slow.

Subsequently, the copying process was adopted in the aeronautic industry as well, where the use of lighter materials and of less massive machines would allow reaching higher speeds. Recently, with the introduction of numerically controlled machine tools which permit attaining a still higher efficiency, the requirement of increasing the copying speed of the model has become more severe.

In this instance, the operation of copying the model and the machining of the workpiece are carried out on two different machines. One measuring machine copies the model and produces a punched tape which serves, in turn, for controlling a numerically controlled milling machine which will machine the workpiece.

Thus, subject to increasing the copying speed, it is possible to feed more than one digitally controlled miller with a single measuring machine.

The existing tracer, intended for operating at low speeds, are not able to work at speeds of an order of magnitude 10 times greater, whereby it has been necessary to provide a new tracer, which is the object of the present invention.

SUMMARY OF THE INVENTION

In accordance with the present invention a tridimensional universal tracer is provided for carrying out a continuous high speed copying of profiles or models, comprising a frame which is adapted to be connected to a measuring head of a measuring machine or a machine tool;

a rod, to the end of which a tracer point is secured;

an oscillating body having a highly elongated lower portion of reduced cross-section in which said rod is slidable axially on air bearings;

a universal joint connected to said frame of the tracer, said joint supporting said oscillating body and comprising two journals at right angles to each other;

a first photoelectric transducer mounted on said body for measuring the axial displacement of said rod, the maximal axial displacement of the rod being of more than 25 mm;

two other electric transducers mounted on said frame for measuring the transverse displacement of said rod, the maximal transverse displacement of said rod being of more than 5 mm;

four pneumatically-actuated cylinders mounted on said frame and arranged to cause return to substantially a vertical rest position said lower portion of said oscillating body, said cylinders being preloaded to a predetermined value;

and at least one spring mounted on said body to partially support the weight of said rod.

The main feature of the tracer point is that of having rather wide excursions which are added to the movements along the three axes $x$, $y$ and $z$ of the machine on which said tracer is installed. Owing to the negligible inertia of the tracer point, its movements can take place at high speed and, on account of the amplitude thereof, they allow the machine time for following the model.

It is obvious that the displacements of both the machine and the tracer point have to be taken simultaneously into account.

The tracer according to the invention can be mounted on both a measuring machine and a profile-copying machine, allowing drastic reduction of the copying time in either case.

BRIEF DESCRIPTION OF THE DRAWINGS

For a better understanding of the present invention, one particular embodiment thereof will now be described, merely by way of non-limiting example, with reference to the accompanying drawings, wherein.

DETAILED DESCRIPTION OF THE INVENTION

Figure 1:
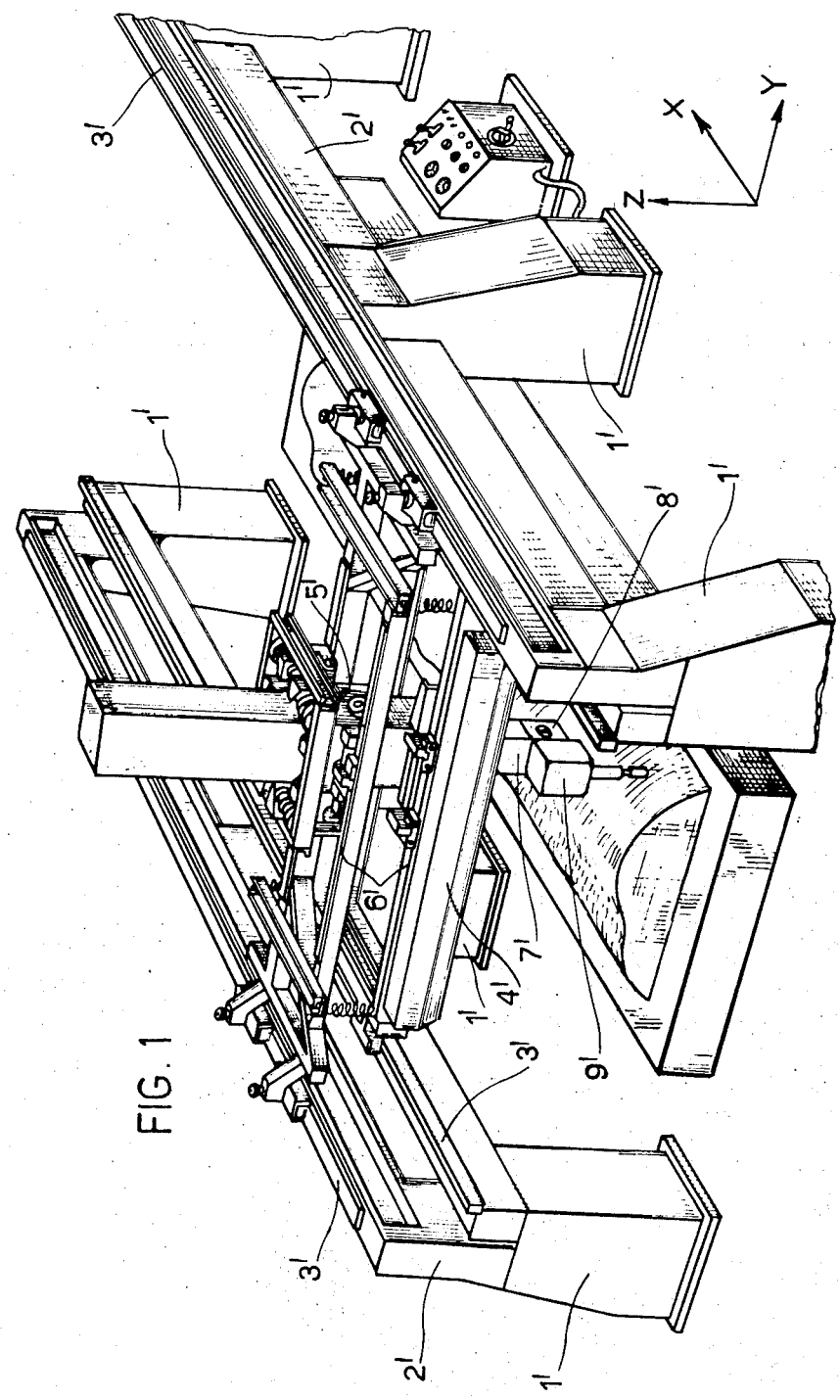
FIG. 1 shows, in perspective view, a measuring machine adapted to cause a measuring head, on which the tracer of the invention can be mounted, movements along three coordinate axes, $x$, $y$ and $z$, respectively.
Figure 2:
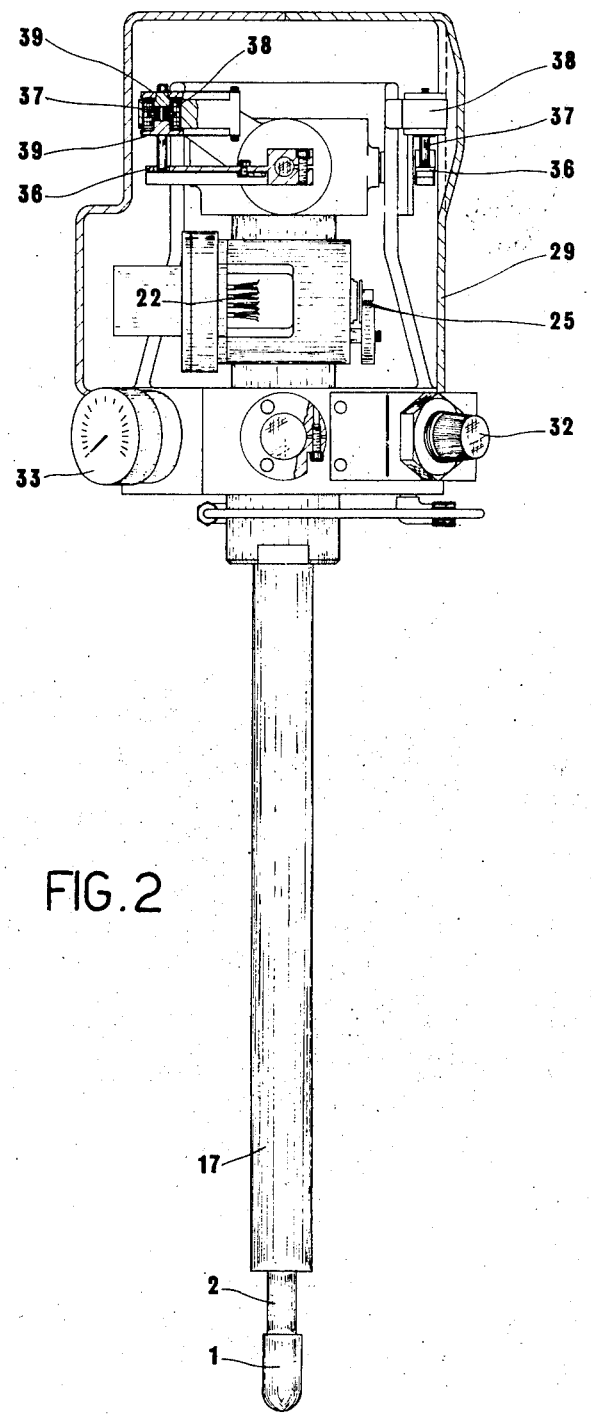
FIG. 2 shows a front view, partly in section, of the tracer of the present invention.
Figure 3:
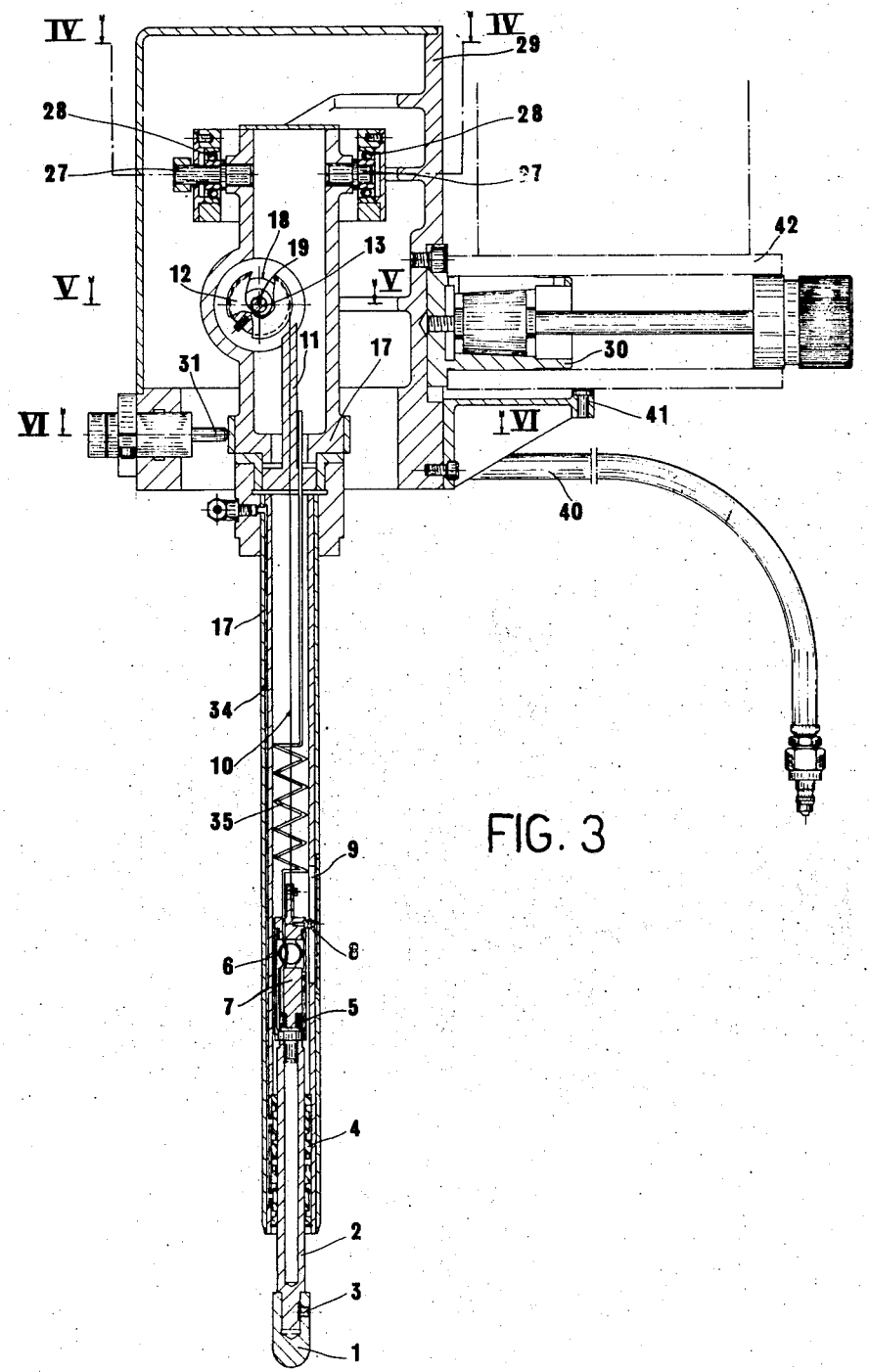
FIG. 3 shows a longitudinal section of the tracer of FIG. 2.
Figure 4:
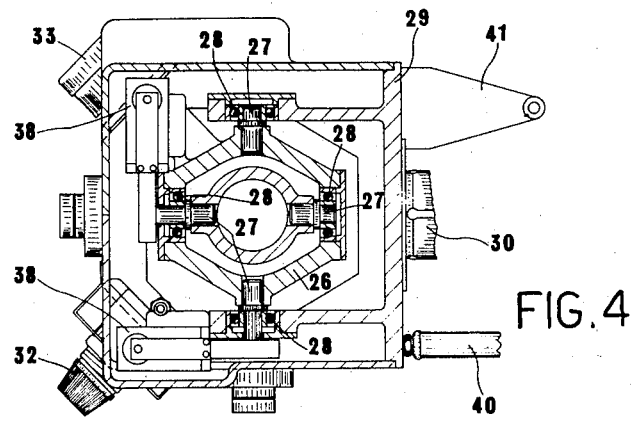
FIGS. 4, 5 and 6 show three cross sections of the tracer illustrated in FIG. 3, taken along lines IV—IV, V—V and VI—VI, respectively.
Figure 5:
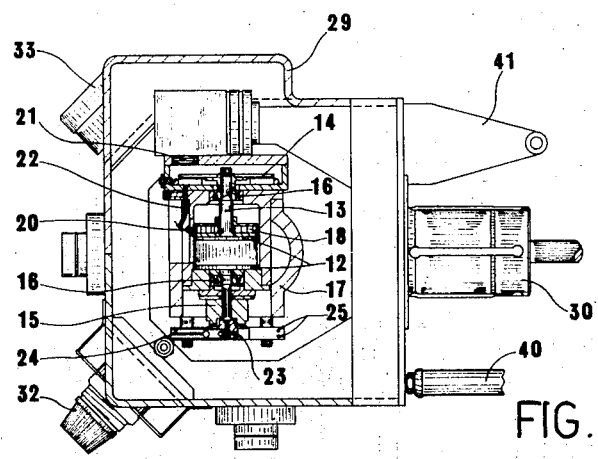
Figure 6:
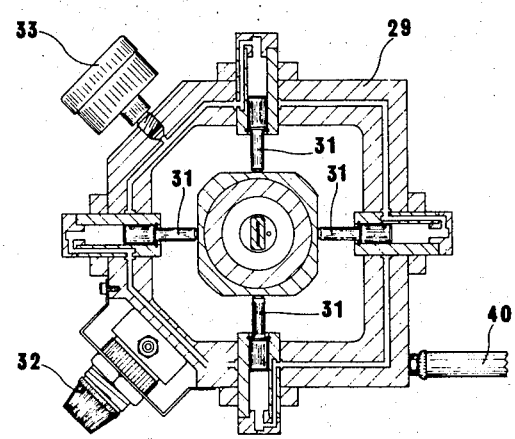

With reference to FIG. 1, the measuring machine comprises two sets of uprights 1' mounted on a basement of reinforced concrete and supporting two horizontal beams 2' provided with guides 3' on which a main carriage 4' slides in longitudinal direction, thereby realizing the movement along the x axis. A central carriage 5' is apt to move transversely on guides 6' provided on the main carriage (y axis) and, finally, a column 7' is adapted to move vertically through the central carriage (z axis). These three movements, which are driven by three actuators, i.e., one for each axis, permit positioning of a measuring head 8' in any point of the space defined by the three strokes of the machine.

On said measuring head several tools can be mounted, particularly a tridimensional tracer 9' for continuous copying of profiles, which is the object of the present invention. A processing computer proper provides for the operation of the machine and is connected to the latter by means of suitable peripheral units. Other peripheral units permit the introduction of instructions and data in the computer as well as the extraction of the data from the latter. Finally, a number of peripheral units for the operator is provided, which form the control panel of the machine.

Figure 7:
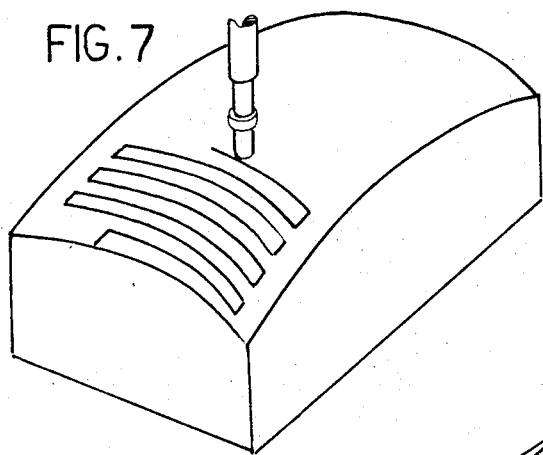
FIGS. 7 and 8 diagrammatically show two copying methods.
Figure 8:
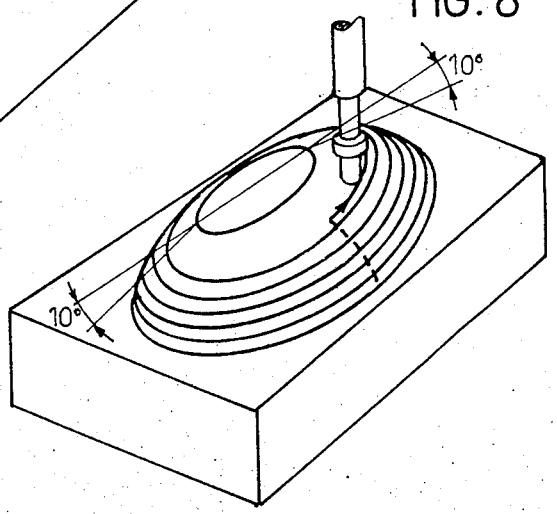

This whole assembly is adapted to copy a model at high speed, thereby producing a tape representative of the workpiece to be obtained, which can be directly used for controlling a milling machine with continuous numerical control. In any case, whatever the machine on which it is installed may be, i.e., a measuring machine or a profile-copying machine, the tracer must have such features as to allow the same to copy at high speed a model according to the generally used copying methods. Two main copying methods can be distinguished, namely:

pendular copying (FIG. 7), wherein the surface can be copied by steps, along both the x and y axes as well in any direction of the xy plane, and contouring copying (FIG. 8), by which it is possible to copy outlines or profiles, up to 360°, of models or patterns. In pendular copying the tracer point moves, keeping, always in touch with the surface to copy, in a plane, which is named scanning plane, with two movements which are in directions at right angles to one another, that is a following movement along the direction of the axis of the tracer point and a feed movement in any direction contained in a plane which is perpendicular to the axis of the tracer point.

When the copying operation in a scanning plane is finished, the tracer point is displaced a step to the contiguous scanning plane, which is parallel to the precedent, to repeat the preceding movements and so on step after step until the surface of the model is completely copied.

In contouring copying the tracer point moves keeping always in touch with the surface to copy, in a copying plane which is perpendicular to the axis of the tracer point, along an inner or outer outline of a model or pattern, with a movement which is the sum of two movements along two directions which are at right angles to one another and lie on the copying plane.

When the copying operation in a plane is finished, the tracer point is displaced a step, in the direction of its axis, to the contiguous copying plane, which is parallel to the precedent, to repeat the preceding movements and so on step after step until the surface of the model is completely copied.

Thus whether in case of pendular copying operation or in contouring copying operation, the tracer point must follow a line which lies in a plane. To do this, the sensitive member must be able to accomplish vertical movements in both directions upwards and downwards, and should be tiltable in any direction with respect to its vertical position. In order to attain high copying speeds as well as to overcome considerable slopes, the weight of the sensitive member must be as reduced as possible, as well as the friction forces that contrast its movement; furthermore, it is of fundamental importance that the excursions of the tracer point, in both the vertical and horizontal directions, should be as wide as possible.

Another important feature is the length of the body of the tracer point and its reduced diameter, in order to allow penetration thereof into cavities without interfering with the model, although maintaining a high transverse stiffness, this all being necessary to avoid the disadvantages of the conventional tracer points mounted on profile-copying machines, resulting in a drastic reduction of the working speed.

One practical embodiment of a tracer point which fulfills the requirements enumerated above is illustrated in FIGS. 2 through 6.

This tracer comprises an interchangeable tracer point 1 simulating a milling cutter and a cylindrical rod 2 to which said tracer point 1 can be secured by means of a dowel 3. The rod 2 slides on "air bearings pressurized from the outside" 4 and, in its upper portion, is connected to an electromagnetic vibrator 5 through a spring ring 6 an a mass 7 housed inside the same.

In order to prevent said rod from rotating, provision is made for a pin 8 mounted on a ball bearing, which slides in a corresponding slot 9. The rod 2 is connected to a pulley 12 by means of a thin steel strap 10, which is guided at its top by a guide of antifriction plastics 11.

The pulley 12 is keyed at its center on a pin 13, to which are also keyed, at one end, a disc 14 provided with uniformly distributed radial slots at its periphery and, at the opposite end, the movable member of an electromagnetic brake 15. The pin 13 rotates on ball bearings 16 housed in an oscillating body 17 of the tracer. The rotation of said pin 13 is contrasted by a cylindrical spiral spring 18 which is connected, at one side, with the same pin by means of a screw 19 and, at the opposite side, with the oscillating body 17 of the tracer by means of a screw 20 (the spring 18 serves the function of discharging a part of the weight of the sliding rod and the member connected therewith). A fixed source of light 21 and four photodiodes 22 constitute, together with the disc 14, a photodetector which is adapted to directly measure, in an incremental numerical form, the vertical position of the sliding rod 2 of the tracer point, in a manner known per se.

On said pin 13 is also fastened, by means of a screw 23, a stem 24 which actuates some limit stops 25 for the movement of the sliding rod 2.

The oscillating body 17 of the tracer point is journalled in a universal joint 26 with journals 27 mounted on ball bearings 28. The universal joint 26 is connected with a stationary portion 29 of the tracer point which, through a large expansion pin 30, can be made integral with a measuring head 42 (diagrammatically shown in chain lines in FIG. 3) of a tridimensional measuring machine.

The oscillating body 17 is held in a vertical position by four pneumatic plungers 31 disposed at right angles to one another.

A pressure regulator 32 permits calibrating the force exterted by said plungers on the oscillating body, and the air pressure can be read on a pressure gauge 33.

The oscillating body 17 has, in its lower portion, the shape of a hollow cylinder and is provided with a duct 34 for feeding the air to the air bearings 4, which are housed inside the same, where a feed cable 35 for said vibrator 5 is also inserted.

Two journals 27 of the universal joint, disposed at right angles to one another, are connected with two stems 36 which actuate the movable members 37 of two differential transformers, whose armatures 38 are integral with the stationary portion of the tracer point. A number of flat springs 39 provide for holding said members 37 constantly pressed against the stems 36.

Therefore, any slanting of the oscillating body will result in rotational movements of the journals 27 and, as a consequence, in displacements of the movable members 37 of the differential transformers. The latter will emit an analog signal which is proportional to the transverse displacement of the tracer point and which is subsequently transformed in a numerical signal by an appropriate converter.

If required, provision may also be made for transverse limit stops, not shown.

A pipe 40 has the function of feeding pressure air, whilst a small square 41 serves as a reference in assembling the tracer point on the measuring head.

The following components of the tracer described above deserve particular attention, inasmuch as they help to impart to the same the characteristics required for a stable operation with high precision and high speed:

1. Air bearings pressurized from the outside

Figure 9:
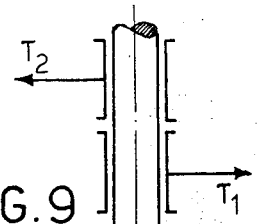
FIG. 9 shows a diagram of the forces applied to the tracer point during the working step, and FIG. 10 diagrammatically shows the movement of the tracer point when it encounters a sudden slope.

From FIG. 9, it can be seen that the ratio of the transverse force $F$ to the vertical force $P$, which are exerted during the contact between the tracer point and the surface of the model, is equal to the trigonometric agent of the angle $(\alpha + \phi)$, where $\alpha$ means the slant of the surface of the model and $\phi$ is the angle of friction between the tracer point and the surface of said model, namely:

$$F/P = \tang(\alpha + \phi)$$

From the above equation, it follows that, being $\phi$ equal, the angle $\alpha$ will increase for increasing values of the ratio $F/P$.

The limit of $F$ derives from the stiffness of the tracer point and the resistance of the surface of the model; therefore, being $F$ determined by the conditions at the profile it will be only possible to decrease $P$.

Assuming now that the direction of displacement of the tracer point is upwards, $P$ will be given by:

$$P = W + Q$$

where $W$ is the residual weight of the tracer point (since a part of the latter can be discharged with suitable expedients) and $Q = f^*$. $T$ is the vertical component generated by the friction forces in the bearings, $T$ being equal to the sum of the reactions $T1$ and $T2$ of said bearings, due to the force $F$ and $f^*$ being the Friction coefficient in the bearings.

As a result, in order to minimize $P$, it will be necessary to reduce not only the weight of the sliding member but also the friction coefficient $f^*$ in the bearings.

With a ratio $F/P = 40$, which has proved to be the maximum value attainable in practice, and with a mean friction coefficient, between the surface of the model and the tracer point, equal to $\tang \phi = 0.3$ to which an angle $\phi = 17°$ will correspond, then $\alpha$ is equal to about 70°.

Figure 10:
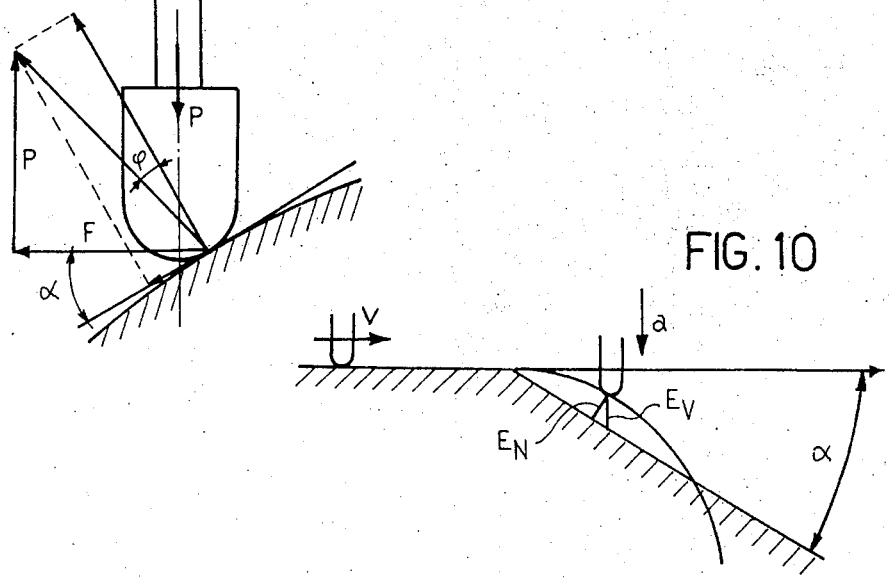

Moreover, from FIG. 10 it can be seen that the error resulting when the tracer point encounters a sudden slope in its downward movement is given by:

$E_n = (V^2/2a) \tang \alpha \sen \alpha$; $E_v = (V^2/2a) \tang^2 \alpha$ where $E_n$ is the error normal to the surface of the model, $E_v$ is the error directed along the vertical axis of the tracer point, $v$ is the copying speed, $M$ is the mass, and $a = (W - Q/M)$ is the vertical acceleration of the tracer point. Therefore, $v$ and $\alpha$ being equal, the error will decrease with increasing values of $a$, i.e., with decreasing values of $Q$.

From the foregoing, it follows that the use of air bearings is necessary when considerable slopes must be overcome. With these bearings, not only the term $Q$ becomes negligible but, being the same provided with a high radial stiffness, they will also reduce the errors resulting from transverse yieldings of the tracer point.

2. Electromagnetic vibrator

Nothwithstanding the use of said air bearings, the maximum theoretical slope superable does not exceed 70°.

In order to increase this slope, it is only necessary to reduce the friction coefficient $\tang \phi$ between the surface of the model and that of the tracer point.

The use of the electromagnetic vibrator 5, in combination with the spring 6 and the mass 7, permits to cause the system, comprising the aforementioned components plus the sliding rod of the tracer point, at the frequency desired, thereby reducing the friction coefficient between the tracer point and the surface of the model, with a drastic reduction of $\phi$ and an increase of $\alpha$. In fact, said models can be constructed with materials having a high surface roughness.

3. Long vertical stroke: $f = \pm 25$ mm

As contrasted with the existing tracer points, which have a stroke of a few millimeters, the tracer point of the present invention can perform a long vertical stroke. In any instant, the actual height is given by the equation:

$$Z_{eff} = Z \pm f$$

wherein $Z$ is the height of the z axis, i.e., of the measuring head, and $f$ is the displacement from a set position with respect to the z axis.

Therefore, the sliding rod of the tracer point will act as a fourth axis. As soon as $f$ becomes different from zero, the head will receive a command tending to bring $f$ back to zero.

On account of the inertia of the system, the response of the head to the command will occur with a certain delay and, therefore, the greater is the excursion allowed to the displacement from a set position, the longer will be the time allowed to the head for recovering, whereby a higher copying speed can be attained.

4. Long body and reduced diameter

The tracer terminates, at its lower portion, with a tracer point of reduced diameter. Other tracer points also have this feature, to permit their penetration into cavities without interfering with the model.

Further, the body of the tracer point not only must be radially stiff, in order to avoid yielding movements, possibly induced by the side thrusts exerted thereon by the model, that might result in errors of measurement, but also must be light in weight if considerable slopes must be overcome.

In the tracer of this invention, the weight of the tracer point having the function of reacting to the lateral thrusts is fully supported by the universal joint. Thus, it has been possible to dimension the same ad abundantiam, so that any yielding thereof will be negligible. This is not the case with the tracer points of the prior art, where the axial and transverse movement are not independent of one another, whereby these tracer points are either insufficiently stiff or too heavy.

As a matter of fact, there should be added to the yielding movements of the oscillating body those of the air bearings and the sliding rod, but the last-mentioned members are highly stiff and the rod is very short, whereby the resulting yielding can be considered negligible.

5. Pneumatic plungers for centering the oscillating body, with adjustable preload This is also a peculiar feature of the tracer of the invention. It allows, depending on the working conditions, calibrating the maximum permissible force $F$, beyond which the tracer point starts breaking down; in this case, the differential transformers will come into action, which measure the transverse displacement, whilst the vertical excursion is arrested by the intervention of the brake.

The fact of being able to calibrate the force $F$ to a desired value is highly useful inasmuch as, as already seen, in order to obtain a good operation, the ratio $F/P$ must be reduced to a minimum.

Now, since $P$ will vary upon variation of the dimensions and, therefore, of the weight of the tracer point used, it is indispensable to be able to vary the force $F$ also, if it is desired to maintain the optimum value of the ratio $F/P$. Moreover, the plungers have the function of centering the tracer point transversely. This centering need not be accurate, since possible errors with respect to the theoretical center are measured by the differential transformers and algebraically added to the height of the axes $x$ and $y$.

The possibility of calibrating the force $F$ permits further to have a safety device whereby, if the tracer point inadvertently strikes against an obstacle, thereby considerably exceeding the force $F$, the tracer will start slanting, thus allowing a transverse displacement of ± 20 mm. This avoids any damage to the tracer point.

6. Large lateral displacements $\Delta x$, $\Delta y = 5$ mm

These displacements are reduced with respect to the vertical stroke since normally, when the tracer point operates with a slant, the copying speed must be reduced and, moreover, a more slanting configuration would alter the simulation of a milling cutter when the latter cuts the workpiece. In fact, the axis of the milling cutter will not slant during the machining operation. However, these displacements are greater, in general, than the displacements allowed by the tracer points of the prior art.

Modes of operation

The numerical data given hereinbelow are merely exemplificative and are not intended to limit in any way the scope of the present invention.

The signals sent by the tracer point to the computer are the following:

$f$ = displacement from a set position with respect to the $z$ axis, with solution:

0.02 mm $\Delta x$ = error along the $x$ axis, with solution:

0.02 mm or 0.05 mm $\Delta y$ = error along the $y$ axis, with solution:

0.02 mm or 0.05 mm

The solution 0.02 mm is used for the pendular copying, whilst that of 0.05 mm is used for the contouring copying. The $f$ signal is given directly by the photorecorder in digital form, whereas the $\Delta x$ and $\Delta y$ signals are given in analog form by the differential transformers and subsequently transformed in digital form in an analog-digital converter before reaching the computer.

Pendular copying

There are two modes of operation, i.e., with:
brake off, and
brake on.

BRAKE OFF

This is the normal condition of operation which permits to overcome slopes of up to 70°, with radial displacements of the tracer point $\delta = \Delta^2 x + \Delta^2 y$ within 0.05 mm. In such conditions, the signal of displacement from the set position $f$, coming from the photodetector, serves the purposes of:

i. calculating the actual height $z \pm f$ in any instant
ii. causing the $z$ axis to follow the wide undulations of the surface with a velocity $V_z = kf$, i.e., with a proportional or linear law
iii. controlling the feed speed $V_a = V_f$ with a parabolic law $V_f = F(f)^2$.

Further, the following conditions are fulfilled:
for $f = 0$, the feed speed has its maximum value:

($V_a = 2.5$ m/min)

for $f = \pm 10$ mm, the feed speed becomes null
for $f = \pm 16$ mm, the machine is in an emergency condition and stops its operation without losing its counting
for $f = \pm 25$ mm, the machine comes in emergency by the action of the limit stops.

From the speed laws (ii) and (iii) it follows that a single value of $f$ exists for each slope or ramp with constant slope. Further, the $\Delta x$ and $\Delta y$ signals serve the purposes of:

iv. controlling the feed speed $V_z = V_d$ with a parabolic law $V_d = F'(\delta^2)$
v. calculating the actual heights $x + \Delta x$ and $y + \Delta y$ at any instant. The feed speed $V_a$ is chosen, for each instant, according to criteria of choice previously set on the computer, equal to $V_f$ or to $V_d$.

OFF/ON switching of the brake

In order to avoid an intermittent operation, it has been established to cause the brake to intervene only when the following condition is fulfilled:

$$\delta = \Delta^2 x + \Delta^2 y \quad 0.05 \text{ mm}.$$

For $\delta$ 0.5 mm, the feed speed should have been reduced to $V_a = V_d = 0.35$ m/min; otherwise the machine would be in emergency.

BRAKE ON

When the brake intervenes, it will be $f=$ const., whereby:

$$Z_{eff} = Z + \text{const.}$$

In these instances, only the differential transformers will intervene, which give the $\Delta x$ and $\Delta y$ signals. These serve the purposes of:

i. Calculating the actual height $x + \Delta x$ at any instant;

ii. calculating the actual height $y + \Delta y$ at any instant;

iii. calculating $\delta = \sqrt{\Delta^2 x + \Delta^2 y}$;

iv. commanding the velocity of the $z$ axis with a linear law $V_z = k'\delta$, and v. commanding the feed speed $V_a = V_d$ with a parabolic law $V_d = F''(\delta 2)$ Further, the following conditions are fulfilled:

for $\delta = 0.5$ mm    $V_d = 0.25$ m/min
for $\delta = 1.5$ mm    $V_d = 0$
for $\delta = 2$ mm    emergency
for $V_d = 0.35$ m/min    emergency Before starting a copying operation, it is necessary to provide for calibration of the tracer point.

This operation is accomplished upon a command by the operator from a pushbutton, with the aid of an appropriate fixture. It consists in resetting the tracer point when the sliding rod has gone back by 25 mm.

The calibration is followed by the initialitation which consists in the choice, by the operator, of a series of parameters or variations which determine the operating conditions of the system. In the case of pendular copying, these can be, for instance:

choice of the lying of the scanning planes
choice of the pitch of the scanning planes
choice of the copying limits
scale factors
correspondence of the axes
permissible chordal error between the theoretical and the actual trajectory
output means, such as printer and tape puncher, and feed speed at the start.

Contouring copying

In the contouring copying, the $z$ axis and the displacement from the set positions are locked. The tracer point will drive the machine with the $\Delta x$ and $\Delta y$ signals only, which have a higher resolution, equal to 0.05 mm.

The initialitation consists in:
choice of the coordinates of the contouring pole
choice of the inner or outer contouring
choice of the contouring direction, i.e., clockwise or counterclockwise
command of approach, to bring the tracer point in contact with the workpiece
starting command of the copying operation.

With the command of approach, the tool is brought against the workpiece and, as soon as a displacement $\delta$ is noticed, then the automatic interlocking to the contact is cut in, thereby imparting to the tracer point a speed $V_n$ which is directed along the straight line passing through the contact point and the pole. The dependence law between $V_n$ and $\delta$ is of a linear type $V_n = k(\delta - 2.5)$, which fulfills the following conditions:

for $\delta = 2.5$ mm    $V_n = 0$
for $\delta = 0$    $V_n = -2.5\,k$
for $\delta = 5$ mm    $V_n = +2.5\,k$ where $V_n$ positive means "away from the pole" in the outer contouring and $V_n$ positive, "towards the pole" in the inner contouring.

Therefore, when $\delta = 2.5$, the tracer point will stop.

In this condition, the machine is ready to start. It is then necessary to give the starting command and the tracer point will initially move with a speed normal to the straight line connecting the point of contact with the pole.

For each point subsequent to the starting point and with a predetermined interval, the direction of the tangent to the curve is calculated in a known manner, for instance by approximation to the straight line connecting the two points, and then the tool will move with a feed speed $V_t$ which is tangent to the curve it is following. A displacement of the tool along the tangent will cause a variation of $\delta$, whereby $\delta \neq 2.5$, and then a speed $V_n$ will also result. Therefore, to the tool two speeds will be imparted, namely a feed speed $V_t$ directed along the tangent and a speed $V_n$ directed along the straight line connecting the point of contact with the pole, which holds the tool against the workpiece.

Accordingly, it will be apparent from the foregoing that the exclusive modes of operation of the tracer point of the present invention are the following:

in pendular copying, the fact that this operation can be carried out in two modes, i.e., either with the brake OFF or with the brake ON, depending upon the fact that the commands are given from the displacement from the set position of the $z$-axis or from the radial deflection;

in pendular copying, the fact that the feed speed varies according to the parabolic law, thereby allowing the feed command to intervene with a certain delay with respect to the command of the $z$ axis, whose velocity does instead vary according to a linear law;

in contouring copying, the fact that there exists a contouring pole about which the tracer point moves.

This permits, in fact, to easily pass from one quadrant of a 360° contour to another, without further information, besides the contouring direction, i.e., clockwise or counterclockwise, and the type of contouring, namely inner or outer contouring.

It will be apparent that many modifications and variations can be introduced in the embodiment of the present invention described above, concerning both the shape and the arrangement of the various parts and components, without departing from the scope of the invention.

What we claim is:

1. Tridimensional universal tracer for carrying out a continuous high speed copying of profiles or models, comprising a frame which is adapted to be connected to a measuring head of a measuring machine or a machine tool;

a rod, to the end of which a tracer point is secured;

an oscillating body having a highly elongated lower portion of reduced cross-section in which said rod is slidable axially on air bearings;

a universal joint connected to said frame of the tracer, said joint supporting said oscillating body and comprising two journals at right angles to each other;

a first photoelectric transducer mounted on said body for measuring the axial displacement of said rod, the maximal axial displacement of the rod being of more than 25 mm;

two other electric transducers mounted on said frame for measuring the transverse displacement of said rod, the maximal transverse displacement of said rod being of more than 5 mm;

four pneumatically actuated cylinders mounted on said frame and arranged to cause return to substantially a vertical rest position said lower portion of said oscillating body, said cylinders being preloaded to a predetermined value;

and at least one spring mounted on said body to partially support the weight of said rod.

2. The tracer of claim 1, wherein said rod is connected with a generator of vibrations, comprising an electromagnetic vibrator, a spring and a mass.

3. The tracer of claim 1, wherein said spring is a spiral spring and is connected at one end with said oscillating body, while the other end is connected with a pulley having wound thereon a wire connected with said rod, said pulley being supported by said oscillating body.

4. The tracer of claim 3, wherein said pulley is coaxial with and rigidly secured to a disc provided with uniformly distributed graduations and is connected to a part of an electromagnetic brake adapted to brake said rod.

5. The tracer of claim 4, wherein said first transducer comprises a source of light and at least one photosensitive element arranged on opposite sides of said graduated disc, the graduations of said disc interrupting the flow of light from said source towards said photosensitive element.

6. The tracer of claim 4, arranged to carry out a pendular copying operation, wherein said tracer point describes successive paths along the surface of the model, said paths being included in planes parallel to the axis of the tracer point and parallel to one another, said tracer including means to accomplish said pendular copying operation with said brake off or on and under the action of a command signal which is a function of said axial displacement or of said transverse displacement, respectively.

7. The tracer of claim 6, wherein, during said pendular copying operation, there are provided means to cause the feed speed of said tracer point to vary according to a parabolic law, and means to cause the vertical displacement speed of said measuring head to vary according to a linear law.

8. The tracer of claim 1, arranged to carry out a contouring copying operation, wherein said tracer point describes successive paths along an inner or outer contour of a model, said paths being included in planes parallel to each other and perpendicular to the axis of the tracer point, said tracer including means which cause it to move, during said contouring copying operation, around a contouring pole so as to pass it from one quadrant of a 360° contour to another, with at least the information concerning the contouring direction, i.e., clockwise or counterclockwise, and the kind of contouring, i.e., inner or outer contouring.

* * * * *

UNITED STATES PATENT OFFICE
CERTIFICATE OF CORRECTION

Patent No. 3,824,893　　　　　　　Dated July 23, 1974

Inventor(s)　Franco Sartorio

It is certified that error appears in the above-identified patent and that said Letters Patent are hereby corrected as shown below:

Column 8, line 28, the equation "$\delta = \Delta^2 x + \Delta^2 y$" should read -- $\delta = \sqrt{\Delta^2 x + \Delta^2 y}$ ; line 63, the equation "$\delta = \Delta^2 x + \Delta^2 y$　0.05mm should read -- $\delta = \sqrt{\Delta^2 x + \Delta^2 y} \geq 0.05$mm -- . Column 9, line 12, the equation "$\delta = \Delta^2 x + \Delta^2 y$" should read -- $\delta = \sqrt{\Delta^2 x + \Delta^2 y}$. Column 10, line 23, in the space between "$\delta$" and "2.5" should be inserted -- $\neq$ --.

Signed and sealed this 29th day of April 1975.

(SEAL)
Attest:

RUTH C. MASON
Attesting Officer

C. MARSHALL DANN
Commissioner of Patents
and Trademarks